J. F. CARSON.
COFFEE MILL BURS.
APPLICATION FILED SEPT. 11, 1914.
1,262,636.
Patented Apr. 16, 1918.
2 SHEETS—SHEET 1.
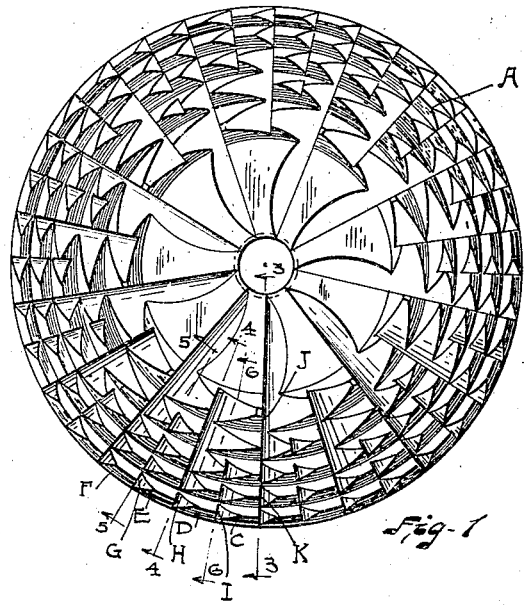
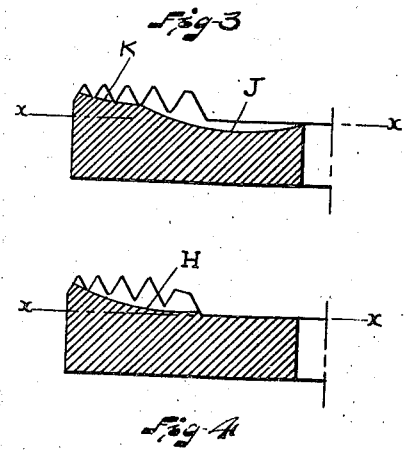
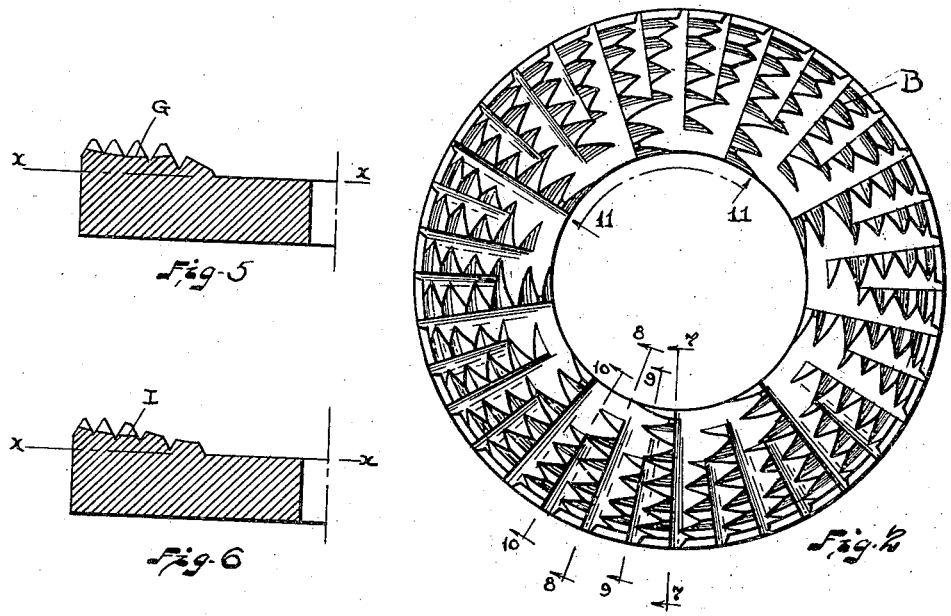

J. F. CARSON.
COFFEE MILL BURS.
APPLICATION FILED SEPT. 11, 1914.

1,262,636.

Patented Apr. 16, 1918.
2 SHEETS—SHEET 2

Witnesses
Oliver M. Kappler
A. J. Hudson

Inventor
Jesse F. Carson
By Thurston King
Attorneys

UNITED STATES PATENT OFFICE.

JESSE F. CARSON, OF CLEVELAND, OHIO, ASSIGNOR TO THE CLEVELAND ELECTRIC AND MACHINE MANUFACTURING COMPANY, A CORPORATION OF OHIO.

COFFEE-MILL BURS.

1,262,636.

Specification of Letters Patent.   Patented Apr. 16, 1918.

Application filed September 11, 1914.   Serial No. 861,172.

*To all whom it may concern:*

Be it known that I, JESSE F. CARSON, a citizen of the United States, residing at Cleveland, in the county of Cuyahoga and State of Ohio, have invented a certain new and useful Improvement in Coffee-Mill Burs, of which the following is a full, clear, and exact description.

This invention relates to mill construction and more particularly to grinding burs which are especially adapted for use in coffee mills.

Generally speaking the invention relates to the elements and combinations thereof, set forth in the accompanying claims.

Figure 7:
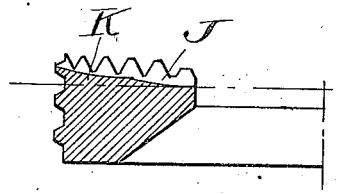
Figure 8:
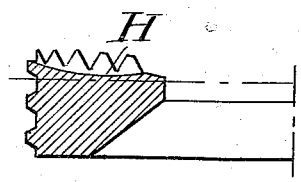
Figure 9:
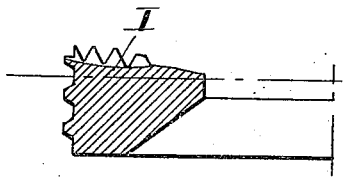
Figure 10:
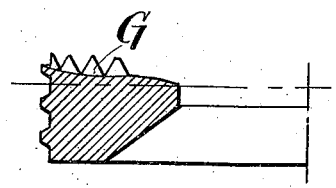
Figure 11:
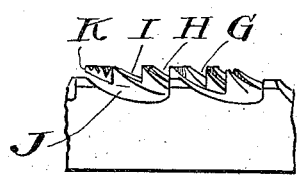
Figure 12:
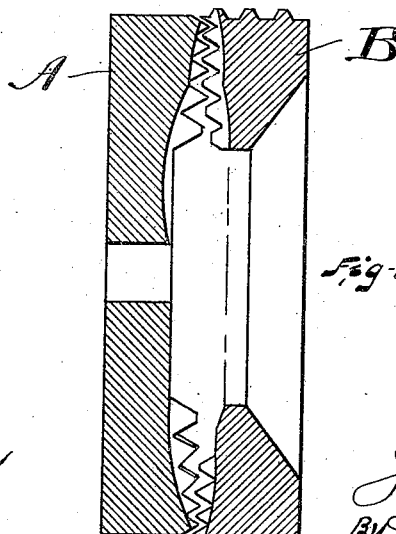

Reference should be had to the accompanying drawings forming a part of this specification in which Figure 1 is a top plan view of one of the burs; Fig. 2 is a top plan view of the companion bur; Fig. 3 is a section upon line 3—3 of Fig. 1; Fig. 4 is a section upon line 4—4 of Fig. 1; Fig. 5 is a section upon line 5—5 of Fig. 1; Fig. 6 is a section upon line 6—6 of Fig. 1; Fig. 7 is a section upon line 7—7 of Fig. 2; Fig. 8 is a section upon line 8—8 of Fig. 2; Fig. 9 is a section upon the line 9—9 of Fig. 2; Fig. 10 is a section upon line 10—10 of Fig. 2; Fig. 11 is an elevation in the direction of the arrows within the limits of line 11—11; Fig. 12 is a sectional elevation of assembled burs.

The two burs forming the pair of burs of my invention are represented in plan in Figs. 1 and 2 and designated generally at A and B.

Both burs have a generally concave face upon which are arranged cutting teeth which are generally pyramidal in form.

The tops of substantially all the teeth lie in a flat plane, the few teeth which do not lie in this plane are truncated for the purpose of more easily permitting the passage of the coffee beans in more or less broken condition outward between the burs.

The arrangement of the cutting teeth upon the faces of the burs is substantially the same. However, I will consider the burs separately.

Bur A: The teeth are arranged in rows both radially and circumferentially, but for purposes of description I shall refer more particularly to their radial arrangement.

The radial rows of teeth are arranged in repeating groups, and each group consists of the radial rows of teeth C, D, E and F. Between the radial rows of teeth are grooves as for instance adjacent row F is groove G, adjacent row E is groove H, adjacent row D is groove I and adjacent row C is a compound groove the parts of which are indicated at J and K.

In cutting the radial grooves, a circular cutter first cuts the groove J, next the groove K, then groove H, I and G in succession. It will be noted that each groove has an arc shaped bottom portion, and that the depth of the groove decreases from the portion of the groove toward the inner part of the bur toward the outer part of the bur.

In the matter of depth, the grooves adjacent the rows of each group vary, for instance, with reference to the plane in which the tops of the untruncated teeth lie, the groove J is deepest, the groove H is of slightly less depth and in succession follow grooves K, I and G, each being slightly less in depth than its predecessor.

Bur B: This bur has its teeth and intermediate grooves arranged in exactly the same manner as that just described, but bur B is provided with a central opening through which material is fed to the burs when in use. Further, the inner two concentric rows of teeth upon bur B are slightly different than those upon bur A for purposes of permitting the coffee to feed into the burs, but the essential characteristics are the same.

When the burs are brought together, the circumferential rows of teeth on one bur lie between the rows of teeth upon the other bur except the inner concentric row upon each bur and these rows are substantially oppositely disposed. The teeth in these rows are truncated and effect the first cracking of the coffee beans as they are fed between the burs.

The operation of the burs will be apparent. One bur will be held while one is turned. The coffee beans will be fed to the cutting faces of the burs through the central opening in bur B. The beans will be cut by the teeth upon the burs and pass outwardly between the burs being cut finer as it progresses. In use there will be some means provided for relative adjustment of the burs to accomplish different degrees of milling of the coffee beans.

Modifications of the precise structure herein disclosed may be made without departing from the spirit of this invention.

Having thus described my invention, what I claim is:

1. In a mill construction, a pair of cooperating burs having adjacent faces provided with radial rows of substantially pyramidal shaped teeth with intervening radial grooves which extend to the edge of the burs, the grooves decreasing in depth from the inner portion of the bur to the outer edge thereof, there being also concentric grooves, said grooves being of decreasing depth from the inner portion of the bur to the outer portion.

2. In a mill construction a bur having upon its working face groups of teeth arranged in radial rows, there being grooves between each group of teeth, which grooves are formed by cutting arc-shaped depressions in the face of the bur, each of said grooves consisting of two arc-shaped depressions in alinement which are of different depths with respect to the tops of the teeth.

3. In a mill construction a bur having upon its working face groups of teeth arranged in radial rows with radial grooves between each group of teeth, the bottoms of said grooves being arc-shaped and said grooves having the bottoms formed of two arc-shaped portions which are of different depths with respect to the tops of the teeth, the radial rows of teeth in each group being separated by grooves which decrease in depth from the inner portion of the groove to the edge of the bur.

4. In a mill construction, a bur having a group of teeth upon the working face thereof, said teeth being arranged in substantially radial rows, and grooves adjacent said teeth, one of said grooves having a portion thereof cut at one depth with respect to the tops of the teeth, and another portion cut at less depth with respect to the tops of the teeth, a second groove which is cut at a depth with respect to the tops of the teeth intermediate the depths in the groove previously mentioned, a third groove which is cut at a depth with respect to the tops of the teeth, which is less than the depth of the outer portion of the first mentioned groove, and a fourth groove which is cut to a less depth with respect to the tops of the teeth than the groove just mentioned.

5. In a mill construction, a pair of cooperating burs, having adjacent faces provided with concentric rows of teeth, the inner row of teeth upon each bur being substantially opposite to each other, the other rows of teeth lying between rows on opposed faces.

6. In a mill construction, a pair of cooperating burs, having adjacent faces provided with concentric rows of teeth, the inner row of teeth upon each bur being substantially opposite to each other, the inner row of teeth upon each bur being truncated, and the other rows of teeth on both burs lying between rows on opposed faces.

7. In a mill construction, a pair of cooperating burs, having adjacent faces provided with concentric rows of teeth, the inner row of teeth upon each bur being substantially opposite to the other, the inner row of teeth upon one of said burs having alternate teeth truncated, the other rows of teeth lying between rows on opposed faces.

In testimony whereof I hereunto affix my signature in the presence of two witnesses.

JESSE F. CARSON.

Witnesses:
A. J. HUDSON,
L. I. PORTER.